US012748429B2

(12) United States Patent
Alexander et al.

(10) Patent No.: US 12,748,429 B2
(45) Date of Patent: Sep. 29, 2026

(54) REMOTE CONTROL AUTONOMOUS VEHICLE WITH OPERATOR PROTECTION AND TERRAIN DYNAMICS

(71) Applicant: Applied Electric Vehicles Ltd, Scoresby (AU)

(72) Inventors: Marc Alexander, Croydon Hills (AU); Julian Broadbent, Warrandyte (AU)

(73) Assignee: Applied Electric Vehicles Ltd, Scoresby (AU)

( * ) Notice: Subject to any disclaimer, the term of this patent is extended or adjusted under 35 U.S.C. 154(b) by 118 days.

(21) Appl. No.: 18/756,312

(22) Filed: Jun. 27, 2024

(65) Prior Publication Data

US 2026/0003354 A1 Jan. 1, 2026

(51) Int. Cl.
*G05D 1/224* (2024.01)
*B60W 60/00* (2020.01)

(52) U.S. Cl.
CPC ....... *G05D 1/2247* (2024.01); *B60W 60/0015* (2020.02); *B60W 2556/45* (2020.02)

(58) Field of Classification Search
CPC ............ G05D 1/2247; B60W 60/0015; B60W 2556/45
See application file for complete search history.

(56) References Cited

U.S. PATENT DOCUMENTS

2020/0272735 A1* 8/2020 Leonhardi ............... G06F 21/51
2020/0353884 A1* 11/2020 Fabris ................. G06F 11/1641
2022/0080992 A1* 3/2022 Yousuf ................ B60W 50/023
2023/0176573 A1* 6/2023 Kumavat ............. G05D 1/0038 701/23

* cited by examiner

*Primary Examiner* — Navid Z. Mehdizadeh
(74) *Attorney, Agent, or Firm* — FIG. 1 Patents

(57) ABSTRACT

Remote control autonomous vehicles with operator protection and terrain dynamics is described. In one or more implementations, a vehicle includes several subsystems designed to perform different vehicle operations. The vehicle also includes a communication subsystem and a central control unit with one or more processors. The communication subsystem receives instructions from a remote operator to actuate the subsystems to perform vehicle operations (e.g., driving along a path). In response to the instructions from the remote operator satisfying safety rules, the processors cause the subsystems to perform the vehicle operations. In this way, a remote operator may utilize the safety routines and terrain adjustments included in the autonomous systems.

20 Claims, 7 Drawing Sheets

REMOTE CONTROL AUTONOMOUS VEHICLE WITH OPERATOR PROTECTION AND TERRAIN DYNAMICS

BACKGROUND

Modern vehicle architectures include various electronic systems that facilitate remote operation and autonomous driving. Remote operation of such vehicles, however, is susceptible to the user error by providing instructions that may cause damage to the remote operator, the vehicle, or nearby persons or objects or place the vehicle in a situation from which it cannot proceed. For example, a remote operator may have an obstructed view of the vehicle and the intended path such that they instruct the vehicle to accidentally crash into nearby objects or even other persons. In yet another example, the vehicle may be remotely operated over a challenging terrain (e.g., an embanked path with loose dirt) and the remote operator may cause the vehicle to take a path that leads it to tip over or to spin out.

In autonomous scenarios, the vehicle systems are susceptible to faults, errors, and edge cases, which can significantly impact vehicle performance and/or cause the vehicles to cease operations because they are unsure how to proceed. For example, an autonomous vehicle may encounter a new terrain or dynamic environment in which it is unsure how to proceed and will stop autonomous operations. If a driver does not occupy such systems, the vehicle must cease all operations until a driver can travel to its location and navigate the vehicle through the environment. Such delays can be costly in terms of travel costs and lost operation time, especially for autonomous equipment (e.g., a mining excavator, a delivery robot) and vehicle fleets with dozens or hundreds of autonomous vehicles.

DETAILED DESCRIPTION

Figure 1:
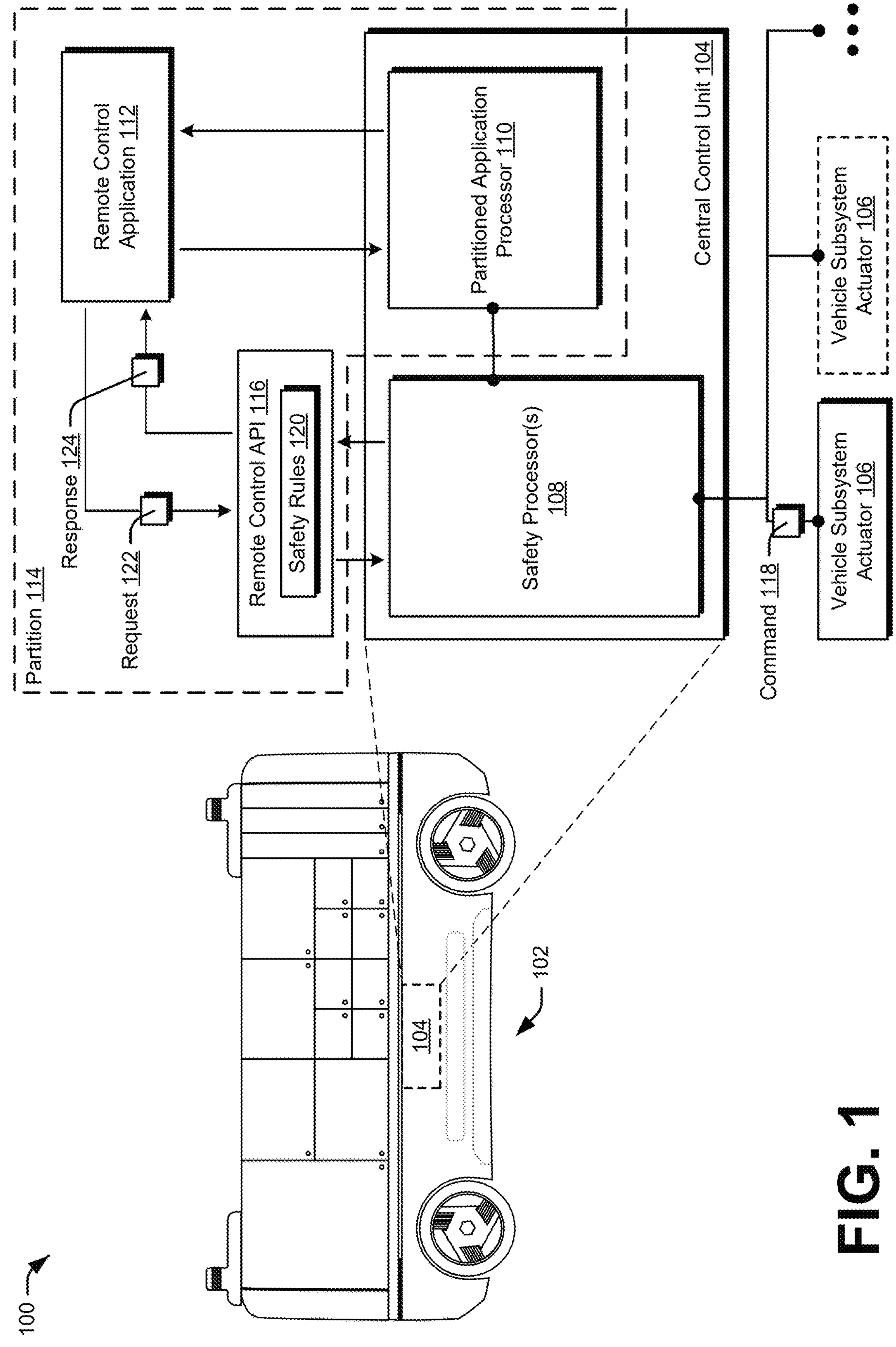
FIG. 1 is a block diagram of a non-limiting example environment, including a vehicle having a vehicle system that implements remote control for autonomous vehicles with operator protection and terrain dynamics.

Modern vehicle architectures include electronic systems facilitating driving, vehicle safety, and user experiences. For example, a vehicle includes multiple electronic control units (ECUs) or controllers distributed about its chassis to control different parts and operations of the vehicle. A braking system, a propulsion system, and a steering system are but a few examples, which the ECUs control.

Some vehicle may be remotely controlled or operated by a user that provides instructions to the ECUs or controllers for various vehicle subsystems. For example, a user may use a controller to maneuver or park a vehicle within a warehouse or storage yard. In another example, a user may safely control (e.g., from a distance) a vehicle with mining explosives to drive between different locations at a mining site. Remote operators, however, may inadvertently instruct the vehicle to drive into themselves, other persons, or a nearby object (e.g., parking structure pillar, pothole, road debris). In other situations, remote operators may not account for terrain dynamics that render the instructed operation unsafe or ineffectual (e.g., drive on a steep embankment that may cause a rollover or start too fast on certain surfaces).

On another hand, autonomous vehicles control vehicle subsystems to provide autonomous operations (e.g., driving to a specified location, delivering items, performing automated tasks) based on their programming and input data from perception sensor devices. Autonomous vehicle systems are susceptible to encountering environments (e.g., an area with extensive road construction), conditions (e.g., challenging terrain or surface), or situations (e.g., contradicting sensor data regarding the surrounding environment) that they are unable or not programmed to navigate. For example, an autonomous vehicle may encounter a chaotic parking environment with many vehicles entering and existing parking spots, some driving counter to prescribed norms, and children going in disparate directions to find their cars. In another instance, an autonomous vehicle may encounter a terrain that causes its drive systems to malfunction. In such situations and other new, unknown, or chaotic environments, the autonomous system may be unable to complete its objective autonomously. As a result, the autonomous vehicle may park far away from the destination, pull over to the side of the road, or completely stop operations.

Other autonomous faults and errors may occur when some hardware is damaged or rendered inoperable (e.g., due to harsh driving conditions or an impact or collision). In other instances, software glitches may cause electronic systems to malfunction. Even though the vehicle may still be operable to continue driving or return to a predetermined location, autonomous operations may cease to safeguard against further electronic hardware and software issues, promote vehicle and pedestrian safety, and/or adhere to laws, regulations, and standards.

One challenge for remote vehicle operation is implementing an override or takeover procedure allowing autonomous systems to ignore or alter instructions from a remote operator that may cause harm to the remote operator, other persons, nearby property, or the vehicle or be ineffectual on certain terrains. Similarly, a challenge for autonomous vehicle architectures is implementing a takeover procedure allowing a remote driver or operator to take over until autonomous systems can resume operation. In some situations (e.g., a fleet of autonomous delivery vehicles or mining equipment), a driver cannot take over operations and navigate the vehicle to a location where autonomous operations can resume. Some existing solutions may allow a remote operator to perform operations (e.g., drive forward, backward, or to a selected location). However, these solutions do not take advantage of the safety features and feedback routines available with many autonomous subsystems within a vehicle.

In contrast, this document describes remote control of autonomous vehicles with operator protection and terrain dynamics. In one example, a vehicle includes several subsystems designed to perform different vehicle operations and a communications subsystem that can receive instructions from a remote operator to actuate the subsystems to perform at least some of those vehicle operations. The vehicle also includes a central control unit with one or more processors that cause the subsystems to perform the operation associated with the instructions from the remote operator in response to the instructions satisfying safety rules. In this way, a remote operator may remotely control the vehicle while utilizing the safety routines included in the autonomous systems.

To execute instructions from a remote operator without compromising the safety of the vehicle and its surroundings, the described system may include a safety processor and another application processor partitioned from the safety processor. By way of example, the partitioned application processor is a separate hardware component that is physically partitioned from the safety processor. For instance, the partitioned application processor and safety processor are separate processing units and communicatively coupled to one another (e.g., via physical Ethernet connections). The application processor may be partitioned from the safety processors in additional ways to prevent execution of the applications on the partitioned application processor from affecting the functioning of the safety processors to control safe operation of the vehicle.

As the partitioned application processor executes instructions from a remote operator via a remote control application, the remote control application may request that vehicle subsystems perform various operations, such as vehicle navigation and vehicle pod and payload control and management. In terms of communication pathways, the safety processor is architecturally and/or logically disposed between the partitioned application processor and the vehicle subsystems. Due to this arrangement, the requests from the remote control application are routed through the safety processor for arbitration. In other words, due to the arrangement, the requests from the remote control application are prevented from being transmitted to the vehicle subsystems without first passing through the safety processor.

The safety processor receives the requests from the remote control application over the connection with the partitioned application processor. Once the requests are received, the safety processor arbitrates the requests based on defined safety rules for upholding any applicable laws, regulations, safety standards (e.g., ASIL-D), or safety interests (e.g., preventing damage to the host vehicle or nearby property). To arbitrate the requests, the safety processor permits requests that satisfy the safety rules and actuate vehicle subsystems to perform the associated operations. The safety processor also denies requests that fail to satisfy the safety rules and do not actuate subsystems to perform the associated operations. By routing the requests through the safety processor, the system enables remote control of autonomous vehicles within a safe operating envelope to provide operator protections and navigate out terrains and situations that the autonomous subsystems cannot navigate.

In some aspects, the techniques described herein relate to a system that includes one or more subsystems of a vehicle, each of the one or more subsystems configured to perform vehicle operations; a communications subsystem of the vehicle configured to receive instructions from a remote operator to actuate the one or more subsystem to perform at least one operation of the vehicle operations; and a central control unit of the vehicle comprising one or more processors configured to, in response to the instructions received from the remote operator satisfying safety rules for the vehicle, cause the one or more subsystems to perform the at least one operation associated with the instructions.

In some aspects, the techniques described herein relate to a system wherein the vehicle operations comprise at least one of driving the vehicle along a roadway or other surface or operating a portion of the vehicle to move within or interact with the environment.

In some aspects, the techniques described herein relate to a system wherein the remote operator does not have a line of sight to the vehicle.

In some aspects, the techniques described herein relate to a system wherein the one or more processors are further configured to provide real-time data from one or more perception sensor devices of the vehicle to the remote operator.

In some aspects, the techniques described herein relate to a system wherein the real-time data includes at least one of one or more images or a video feed of the environment from a camera system, location data for one or more nearby objects in the environment, or state information for one or more subsystems or components of the vehicle.

In some aspects, the techniques described herein relate to a system wherein the central control unit comprises two or more processors, the two or more processors including: a first processor configured to: in response to one or more autonomous-driving subsystems not being able to perform an autonomous operation of the vehicle, provide a notification to the remote operator that the autonomous operation of the vehicle has ceased; and receive the instructions from the remote operator to actuate the one or more subsystems to perform the at least one operation; and a second processor configured to maintain an operating state of vehicle within a safe operating envelope by: receiving one or more requests from the first processor to perform the at least one operation associated with the instructions; and determine whether the one or more requests from the first processor satisfy the safety rules.

In some aspects, the techniques described herein relate to a system wherein the first or second processor is further configured to provide feedback to the remote operator that the instructions cannot be carried out in response to the one or more requests not satisfying the safety rules.

In some aspects, the techniques described herein relate to a system wherein the second processor is further configured to prevent the one or more requests being communicated to the one or more subsystems of the vehicle in response to the one or more requests not satisfying the safety rules.

In some aspects, the techniques described herein relate to a system wherein the one or more processors provide an application programming interface for a remote control application that prevents access by a remote control application to the one or more subsystems unless the instructions satisfy the safety rules, the remote control application being configured to receive the instructions from the remote operator.

In some aspects, the techniques described herein relate to a system wherein satisfying at least one of Automotive Safety Integrity Level D (ASIL D) standards, ASIL C standards, ASIL B standards, ASIL A standards, ISO standard 26262, local laws, or local regulations.

In some aspects, the techniques described herein relate to an electronic control unit for controlling an operation of a vehicle, the electronic control unit including a first processor configured to receive instructions from a remote operator to actuate one or more subsystems to perform the operation of the vehicle; and a second processor communicably coupled to the first processor, the second processor configured to: receive requests from the first processor associated with carrying out the instructions from the remote operator; filter the requests to determine safe requests that satisfy safety rules; and actuate the one or more subsystems to perform the safe requests.

In some aspects, the techniques described herein relate to an electronic control unit wherein the first processor is physically partitioned from the one or more subsystems and the requests from the first processor are routed to the second processor via a communicative coupling.

In some aspects, the techniques described herein relate to an electronic control unit wherein the electronic control unit further comprises a third processor configured to operate redundantly with the second processor to maintain vehicle operations within a safe operating envelope.

In some aspects, the techniques described herein relate to an electronic control unit wherein the third processor is configured to maintain the vehicle operations within the safe operating envelope when a malfunction occurs with the second processor.

In some aspects, the techniques described herein relate to an electronic control unit wherein the second processor is configured not to actuate the one or more subsystems for denied requests that do not satisfy the safety rules.

In some aspects, the techniques described herein relate to an electronic control unit wherein the second processor is configured to provide a bypass option to the remote operator via the first processor, the bypass option allowing actuation of the one or more subsystems for a denied request.

In some aspects, the techniques described herein relate to an electronic control unit wherein the safety rules include at least one of Automotive Safety Integrity Level D (ASIL D) standards, ASIL C standards, ASIL B standards, ASIL A standards, ISO standard 26262, local laws, or local regulations.

In some aspects, the techniques described herein relate to an electronic control unit wherein the instructions from the remote operator are received by a remote control application executed by the first processor, the remote control application in communication with a corresponding application on a remote computing device.

In some aspects, the techniques described herein relate to an electronic control unit wherein the corresponding application on the remote computing device is configured to provide instructions for remote control to multiple autonomous vehicles.

In some aspects, the techniques described herein relate to a method implemented by an electronic control unit for controlling an operation of a vehicle, the method including receiving, by a first processor of the electronic control unit, instructions to actuate one or more subsystems of the vehicle, the instructions received from a remote operator; receiving, by a second processor of the electronic control unit and from the first processor, requests associated with carrying out the instructions from the remote operator; filtering, by the second processor, the requests by permitting the instructions that satisfy safety rules; and actuating the one or more subsystems to perform the instructions that satisfy the safety rules.

FIG. 1 is a block diagram of a non-limiting example environment 100, including a vehicle 102 having a vehicle system that implements remote control for autonomous vehicles with operator protection and terrain dynamics.

The environment 100 includes a vehicle 102, which is configured to operate in any of a variety of vehicle operating environments, examples of which include but are not limited to a roadway, a traffic scenario, an off-road area (e.g., a construction site, a mining operation, a recreational area), on or in the water, on or in other substances (e.g., within fluids and/or cellular material), and other public or private spaces, to name a few. The vehicle 102 may be any type of vehicle including, for example, ground vehicles (e.g., truck, van, tractor-trailer, tank, mining equipment, etc.), manufacturing equipment, delivery vehicles and robots, rail vehicles, marine vehicles, or other types of vehicles. The vehicle 102 is unmanned (e.g., autonomously controlled, remotely controlled), and in at least one other example the vehicle 102 is manned (e.g., semi-autonomously controlled, at least partially human operated) but the driver or operator is unable to operate the vehicle 102.

In the illustrated environment 100, the vehicle 102 includes a central control unit 104. The central control unit 104 is connected to multiple vehicle subsystem actuators 106 to control respective vehicle subsystems (not shown). Examples of such vehicle subsystems include but are not limited to steering control, brake control, motor control, rotor control, motion control, traction energy, energy management, power management, battery charging, connectivity (e.g., data and telemetry, cellular, Bluetooth, near-field communication (NFC), 5G, etc.), perception sensors (e.g., cameras, proximity sensors, lidar sensors, radar sensors, thermometers, etc.), human-machine user interfaces (e.g., screens and/or display devices), in-vehicle infotainment, HVAC (e.g., heating, ventilation, and air conditioning), lighting (e.g., interior and/or exterior), windshield wipers, seating, locking (e.g., doors), window actuation, alarms, payload services, and extensible-assembly control (e.g., pod control, exterior tool control, etc.), to name just a few.

The central control unit 104 includes one or more safety processor(s) 108 and a partitioned application processor 110. In one or more implementations, the partitioned application processor 110 is partitioned from other hardware of the central control unit 104 (e.g., from the safety processor 108) in various ways. In one or more implementations, the central control unit 104 is an ECU or included as part of one. In one implementation, the safety processor 108 and the partitioned application processor 110 are part of a single ECU.

In at least one variation, the partitioned application processor 110 is separate hardware from the safety processor 108 (e.g., a separate processing unit and/or processor card). Alternatively, or additionally, the partitioned application processor 110 is "firewalled" from other components of the central control unit 104, e.g., from the safety processor 108. A physical device or software implements the firewall between the partitioned application processor 110 and other central control unit 104 components.

The safety processor 108 and the partitioned application processor 110 each include memory. As part of partitioning, the memory of the partitioned application processor 110 may be isolated from the memory of the safety processor 108. In such implementations, the partitioned application processor 110 may be limited to accessing its isolated memory and/or prevented from directly accessing the memory of the safety processor 108.

Further, the central control unit 104 includes two safety processors 108 in at least one implementation. In such implementations, the safety processors 108 may be configured to operate the vehicle 102 redundantly. For instance, each safety processor 108 may be configured to receive the same inputs from perception sensor devices and/or subsystems, perform vectoring computations in the same manner, output the same motion control commands based on the same vectoring computations, and so forth. In this way, in the event a first safety processor 108 fails or malfunctions, the second safety processor 108 can seamlessly assume control of vehicle 102.

In accordance with the described techniques, the safety processor 108 controls the motion and vectoring of the vehicle 102. In other words, the safety processor 108 maintains an operating state of the vehicle 102 (e.g., the vehicle's position and location) within a safe operating envelope of the vehicle 102. By contrast, the partitioned application processor 110 is configured to execute a remote control application 112, which is an application allowing for remote control or teleoperations of the vehicle 102. By partitioning the partitioned application processor 110 from the safety processor 108, issues that arise due to executing the remote control application 112 (e.g., software issues, hardware issues, and/or single event failures) are prevented from affecting safe motion and control of the vehicle 102. In other words, the partitioning prevents the remote control application 112 from interfering with safety-critical vehicle operations, like motion control and vectoring.

Even though the partitioned application processor 110 is partitioned from the safety processor 108 in one or more ways, the partitioned application processor 110 is communicably coupled with the safety processor 108. For example, the safety processor 108 and the partitioned application processor 110 are communicably coupled via one or more wired or wireless connections. Example wired connections include, but are not limited to, Ethernet connections or links, memory channels, buses (e.g., a data, system, or address bus), interconnects, through silicon vias, traces, pins, sockets, and planes. Other examples of connections include optical connections, fiber optic connections, and/or connections or links based on quantum entanglement.

In accordance with the described techniques, the safety processor 108 and the partitioned application processor 110 communicate, such as over the wired and/or wireless connection, to control one or more subsystems of the vehicle 102 in connection with executing the remote control application 112. Notably, the partitioned application processor 110 is configured to execute the remote control application 112 using its respective processor core(s) and memory (not shown). By using partition 114, the remote control application 112 is not executed using any core(s) and/or memory of the safety processor 108. In at least one implementation, the remote control application 112 is prevented from using the cores and/or memory of the safety processor 108.

In one or more implementations, the partition 114 is implemented at least in part by hardware partitioning as discussed above. Additionally, partition 114 may be implemented at least partially by software and/or firmware, such as by using an application programming interface (API). In other words, partition 114 functionally partitions the remote control application 112 from directly accessing or otherwise using the safety processor 108 or the vehicle subsystem actuators 106. Instead, the partitioned application processor 110 includes a remote control API 116 to facilitate communication of requests and responses between the remote control application 112 and the safety processor 108.

In one implementation, the partitioned application processor 110 executes the remote control application 112 within partition 114 by using one or more cores and memory of the partitioned application processor 110 to execute instructions. Broadly speaking, the remote control application 112 is intended to affect the operation of vehicle 102 based on instructions received from a remote operator, such as driving in dangerous situations for drivers or completing vehicle operations in a dynamic environment. In other scenarios, the instructions may be received from a remote operator to maneuver the vehicle 102 from a terrain or scenario that the ADAS subsystems cannot navigate out of. To do so, the remote control application 112 outputs a request 122 to the remote control API 116. The request 122 indicates at least one operation associated with the instructions received from the remote operator for at least one subsystem to perform. For example, request 122 indicates moving the vehicle 102 forward. From a hardware perspective, the partitioned application processor 110 transmits the request 122 to the remote control API 116 and/or the safety processor 108, e.g., via wired or wireless connections.

In operation, the remote control application 112 receives requests or instructions from a remote operator to control one or more operations or subsystems of the vehicle 102. The remote control application 112 then issues a request 122 that a vehicle subsystem performs some action (e.g., move in a certain direction) according to instructions from the remote operator. The safety processor 108 arbitrates this request 122, e.g., it permits or denies it. If the safety processor 108 permits the request, the central control unit 104 or the safety processor 108 controls the respective vehicle subsystem to carry out the requested action. For example, the safety processor 108 sends a command 118 to one or more vehicle subsystem actuators 106 to cause the respective vehicle subsystems to perform the requested action associated with the request 122. If the safety processor 108 denies the request 122, however, the safety processor 108 or the central control unit 104 does not carry out the requested action, e.g., the vehicle 102 is not moved according to the remote control instructions. In other words, the command 118 is not sent to the vehicle subsystem actuators 106 when the request is denied. In one implementation, the safety processor 108 discards denied requests. In one or more implementations, the safety processor 108 arbitrates the requests 122 based on safety rules 120 or data related to the driving environment (e.g., terrain dynamics).

The safety processor 108 receives the request 122 over the connection and executes the remote control API 116 to arbitrate the request 122. The remote control API 116 determines whether to permit or deny the request 122. In one or more implementations, the remote control API 116 arbitrates the request 122 based at least partly on the safety rules 120 or terrain dynamics (e.g., road surface, embankment slope). For example, if the remote control API 116 determines that request 122 satisfies the safety rules 120 or terrain dynamics, it permits the specified operation and the safety processor 108 outputs at least one command 118 to actuate a vehicle subsystem actuator 106 to perform the requested operation. However, if the remote control API 116 determines that request 122 does not satisfy the safety rules 120, it denies the specified operation or performs a different operation that satisfies the safety rules 120 (e.g., navigates the vehicle 102 forward (as instructed) but around a nearby object). In other words, the safety processor 108 does not output the command 118 to the vehicle subsystem actuator 106. Further, the safety processor 108 may discard a denied request or determine an alternative operation to achieve the instruction safely.

In one or more implementations, the remote control API 116 outputs a response 124 to the remote control application 112. For example, the response 124 may indicate the arbitrating determination, including whether the request 122 was permitted or denied. Additionally, response 124 may include other information (e.g., reasons why a request was permitted or denied, system messages associated with the request, or information about the requested operation or the environment 100 obtained from perception sensor devices).

In one or more implementations, the safety rules 120 correspond to at least one safety standard for operating vehicles, examples of which include Automotive Safety Integrity Level D (ASIL D), ASIL C, ASIL B, and ASIL A. Another standard example is International Organization of Standardization (ISO) 26262, which is the functional safety standard for electrical, electronic, and programmable electronic devices in the automotive industry. This standard defines a set of functional safety requirements of different electrical and electronics systems in a vehicle. In some jurisdictions, adherence to this standard is a condition for allowing a vehicle to operate on a road. The standard assigns an Automotive Safety Integrity Level (ASIL) to each part or function of a vehicle. As noted above, there are four different ASILs including ASIL-A, which is assigned to vehicle functions and parts that present a lowest risk to safety and ASIL-D, which is assigned to vehicle functions and parts that present a highest safety risk. For example, ASIL-D is used for vehicle components involved in high-exposure driving situations where malfunctions cause vehicles to be most difficult to control, which can lead to death or major bodily harm.

Other examples of safety standards, which may additionally or alternatively correspond to or otherwise be maintained by adhering to the safety rules 120, include but are not limited to, Safety Integrity Level 4+ (SIL-4+), SIL-4, SIL-3, SIL-2, SIL-1, Category A, Category B, Category C, Category D, Category E, Design Assurance Level A (DAL-A), DAL-B, DAL-C, DAL-D, and DAL-E. In this way, if the request 122 satisfies the safety rules 120, the vehicle's operation satisfies (or complies with) the standard.

Accordingly, by arbitrating requests 122 from the remote control application 112 based on safety rules 120 that are ASIL-D compliant, the remote control API 116 and the safety processor 108 ensure that operation of the vehicle 102 satisfies ASIL-D. In one or more implementations, the safety processor 108 is ASIL-D compliant, such that the architecture of the safety processor 108 and/or its operations are configured to satisfy ASIL-D. For example, the safety processor 108 is configured to control the motion and vectoring of vehicle 102 in a manner that satisfies ASIL-D. Since any requests from the remote control application 112 are architecturally routed through the safety processor 108 and because the safety processor 108 performs operations that satisfy ASIL-D, the safety processor 108 does not permit requested operations that do not satisfy ASIL-D or permits them until the vehicle 102 comes to rest before violating ASIL-D. Although ASIL-D is discussed in the immediately preceding example, it is appreciated that any vehicle safety standard or combination may be used per the described techniques.

The terrain dynamics may include road surface traction, slope, or other characteristics that may affect the vehicle's operation. For example, the vehicle 102 may obtain wheel slippage data and adjust the reduce the motor torque applied to the vehicle's wheels, switch the vehicle into four-wheel or all-wheel drive, or reduce the acceleration rate of vehicle 102 in response to the instructions from the remote operator. The safety processor 108 may also adjust the vehicle's path to avoid a steep slope that causes vehicle 102 to roll over based on vectoring predictions, terrain perception, and center-of-gravity predictions. In another example, the safety processor 108 may cause the vehicle 102 to slow down or drive around a pothole or other feature of the roadway to avoid potential damage to stored goods.

Since the remote control API and/or safety processor 108 deny or modify any requests 122 that compromise the safety of vehicle 102, passengers, cargo, other vehicles, and nearby physical property, the safety processor 108 at least partially offloads the responsibility of vehicle safety from the remote operator or the remote control application 112. In other words, because the safety processor 108 ensures safe operation, users of the remote control application 112 (e.g., teleoperators) have an extra level of safety knowing that the safety routines and terrain dynamics of the vehicle subsystems are being used to maintain safe operation of the vehicle 102. In other words, the central control unit 104 does not rely on the remote control application 112 or the teleoperator to properly address terrain dynamics or maintain compliance with safety goals defined by an original equipment manufacturer, vehicle manufacturer, vehicle customer, and/or various safety standards and regulations. In this way, remote control of autonomous vehicles is possible without being independently verified to satisfy stringent safety standards. Teleoperations are thus simplified and made easier.

As one example, an autonomous crane is remotely driven and operated at a construction site. If the remote operator instructs the crane to drive along a heavily-sloped surface, the safety processor 108 may either cause the crane to come to a rest without traveling over the sloped surface (e.g., to avoid a roll over) or alter the vector path of the crane to avoid the sloped surface. In this way, the safety processor 120 accounts for terrain dynamics that the remote operator may have not observed or overlooked and prevents a potential roll over.

For example, if the remote operator instructs the extension arm of the crane to be rotated, a vehicle subsystem may monitor whether the extension arm will collide with another object during its rotation. In this example, the vehicle subsystem can retract the extension arm during rotation to prevent a collision. In another example, the vehicle subsystem can stop the rotation just before a collision and provide feedback to the remote operator about the imminent collision and rotation cessation. In yet another example, the remote control API 116 or safety processor 108 may provide an override option for the rotation (or some subset of tasks), thus allowing the collision. The remote operator may determine that (minimal) damage to the extension arm, vehicle 102, or the nearby object is acceptable to move the crane (from its current situation).

As another example, a vehicle may be autonomously operating and encounter a landslide or dynamic environment that it is unsure of how to proceed through. Because the ADAS subsystem is unsure how to safely proceed, autonomous operation ceases. The central control unit 104 or the safety processor 108 may notify the remote control application 112 that autonomous operations have ceased. The remote control application 112 then provides an alert to a remote operator via a remote control application 112 installed on a remote computer or via a web interface. The remote operator can then provide instructions to the safety processor 108 via the remote control application 112 to navigate the vehicle from its current position until autonomous operations can resume. Perception sensor data (e.g., a video feed of the environment 100 and traction sensor data for one or more wheels) can be provided to the remote operator via the remote control application 112. Based on the perception sensor data and their driving knowledge, the remote operator can teleoperate the vehicle and navigate to a location from which the ADAS subsystem indicates that it can resume autonomous operations. By verifying the instructions from the remote operator against the safety rules 120, the remote operator can provide instructions with confidence that the safety processor 108 or other vehicle subsystems will engage built-in safety features to prevent vehicle damage, collisions with objects, or performance of other unsafe operations.

Further advantages of this architecture include but are not limited to, the extensive programmability of the vehicle 102's teleoperations (e.g., with applications on other devices such as mobile phones and/or tablets of a wide range of vehicle settings and/or functions) by a wide variety of users (in addition to the vehicle manufacturer), while maintaining one or more safety standards of certified integrity of the control system and vehicle 102. Thus, a remote control interface or application for third-party devices is flexibly programmable without requiring recertification of the vehicle 102 to the desired or required safety standard, which can take years. In addition, a single teleoperator can provide remote control for a fleet of autonomous vehicles.

Figure 2:
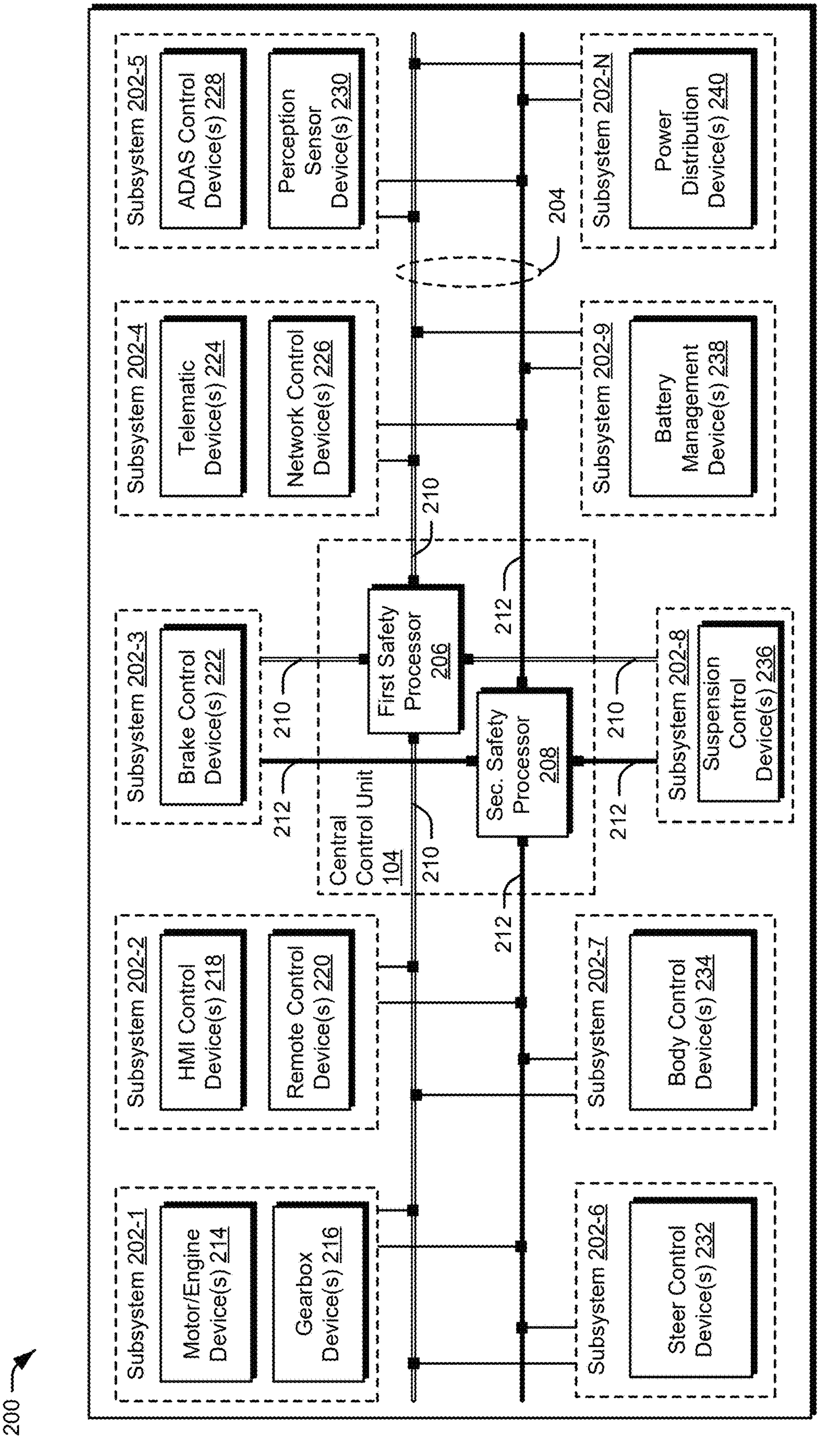
FIG. 2 is a block diagram of a non-limiting example of a vehicle system that implements remote control of the autonomous vehicle with operator protection and terrain dynamics.

FIG. 2 is a block diagram of a non-limiting example of a vehicle system 200 that implements remote control of the autonomous vehicle with operator protection and terrain dynamics. For ease of description, the vehicle system 200 is described in the context of the vehicle 102 in FIG. 1 including with reference to similar labeled elements. For example, the vehicle system 200 includes a central control unit 104. The vehicle system 200 also includes a plurality of subsystems 202 (labeled individually as subsystem 202-1 through subsystem 202-N, where N is any integer) managed by the central control unit 104 to implement various vehicle functions. In at least one example, the vehicle system 200 includes additional, fewer, and/or different subsystems 202 than those depicted in FIG. 2.

The central control unit 104 is configured as a centralized controller that enables information transfer between the subsystems 202 over a vehicle network 204. By exchanging information with subsystems 202, the centralized controller causes the execution of subsystem functions that enable driving. For instance, the central control unit 104 receives signals output on the network 204 from one of the subsystems 202, and based on information inferred from the signals, the central control unit 104 outputs additional signals on the network 204 to cause a particular behavior of another of the subsystems 202.

In accordance with the described techniques, the central control unit 104 includes a first safety processor 206 and a second safety processor 208. The first safety processor 206 and the second safety processor 208 represent separate processors, processor cards, processor cores, control units, microcontrollers, system on chips, or other processor technology. Each of the first safety processor 206 and the second safety processor 208 are configured to execute instructions either as software or firmware to implement functionality of the central control unit 104. Although not shown, in some examples, the central control unit 104 includes a non-transitory computer-readable storage medium (e.g., data store, cache, static memory, dynamic memory, flash memory, disk storage) that maintains the instructions and data for implementing the instructions executed by each of the first safety processor 206 and the second safety processor 208. For example, the first safety processor 206 and the second safety processor 208 include respective data stores that contain the instructions retrieved from the data stores and executed during the operation of vehicle 102.

In at least one variation, the central control unit 104 is distributed throughout the vehicle system 200 in two or more locations. In such a distributed implementation, the first safety processor 206 is included in a first control system and the second safety processor 208 is included in a second control system. Each control system includes one or more safety processors in other distributed implementations.

In some examples, the first safety processor 206 and the second safety processor 208 are functionally redundant. The vehicle system 200 relies on either the first safety processor 206 or the second safety processor 208 (e.g., one at a time) to actively cause operations to be performed by the subsystems 202. For example, while the first safety processor 206 is orchestrating operations of the subsystems 202, the second safety processor 208 is maintained in a ready, standby state. Notably, in this ready standby state, the second safety processor 208 also runs as if it is operating vehicle 102, e.g., making vehicle control and vectoring decisions as if it is responsible for operating it in real-time.

If the first safety processor 206 fails, the central control unit 104 activates the second safety processor 208 to seamlessly take over and manage the subsystems 202 where the first safety processor 206 left off. When the second safety processor 208 takes over, the vehicle 102 may be forced to operate in a safe state, which can include autonomously maneuvering away from other vehicles, objects, and pedestrians to come to a controlled stop. This way, the functional redundancy implemented by the first safety processor 206 and the second safety processor 208 help the central control unit 104 satisfy ASIL-D reliability and safety requirements. In such implementations, the first safety processor 206 and the second safety processor 208 may be located at different locations within the vehicle.

The vehicle network 204 represents any suitable vehicle network technology, including wired and wireless signal propagation mediums. The vehicle network 204 enables real-time data exchange, safety enhancements, and efficient traffic management among the components of the vehicle system 200. The vehicle network 204 can include various switches, routers, transceivers, controllers, chokes, filters, terminations, and other networking equipment beyond transmission lines, cables, wires, buses, and other signal routing technologies. In at least one implementation, the vehicle network 204 adheres to an in-vehicle networking protocol. For example, the vehicle network 204 represents a combination of one or more of a controller area network (CAN), an automotive ethernet network (AEN), serializer/deserializer (SerDes) network, local interconnect network (LIN), or a FlexRay network (FRN), to name a few.

In at least one example, to implement the redundancy of the central control unit 104, the vehicle network 204 is composed of dual physical network paths. A network path 210 communicatively couples each of the subsystems 202 to the first safety processor 206. A separate network path 212 communicatively links each of the subsystems 202 to the second safety processor 208. For example, if a failure at the first safety processor 206 is partially caused by a fault in the network path 210, the second safety processor 208 is unaffected by the network fault and operable to communicate with the subsystems 202 using the network path 212. The functional redundancy implemented by the network paths 210 and 212 further helps the central control unit 104 satisfy the ASIL-D reliability and safety requirements.

In at least one other example, to implement the central control unit 104 redundancy, the vehicle network 204 is composed of dual logical network paths. The network path 210 and the network path 212 may be separate logical paths through the vehicle network 204 that communicatively link each subsystem 202 to the first safety processor 206 and the second safety processor 208 using the same physical wires. For example, communications to and from the first safety processor 206 and the second safety processor 208 are interleaved on a single set of wires that make up the vehicle network 204. If a failure at the second safety processor 208 and/or the network path 212 occurs, communications from the first safety processor 206 can reach the subsystems 202 using the network path 210. The functional redundancy implemented by interleaving the network paths 210 and 212 further helps the central control unit 104 satisfy the ASIL-D reliability and safety requirements.

The subsystems 202 include one or more edge devices operatively coupled to the vehicle network 204 to provide information to the central control unit 104 and receive commands from the central control unit 104 to implement various vehicle functions. For example, each of the subsystems 202 can include one or more actuators, microcontrollers, machines, or other equipment to perform specific vehicle tasks at the discretion of the edge devices within the subsystems 202.

In one or more implementations, the vehicle includes a subsystem 202-1 which is a propulsion or drive subsystem. Motor/engine devices 214 of the subsystem 202-1 represent edge devices managed by the central control unit 104 to command vehicle propulsion units (e.g., an engine, a motor) to execute driving functions of the vehicle 102 (e.g., forward motion, reverse motion, acceleration, deceleration). In one or more examples, the motor/engine devices 214 manage operations of an engine of vehicle 102, including fuel injection, ignition timing, emissions control, and engine health monitoring. In at least one aspect (e.g., in the context of electric vehicles), the motor/engine devices 214 control inverters and motors that convert electric energy into mechanical energy for applying torque to wheels.

In addition, the subsystem 202-1 includes gearbox devices 216. Also referred to as a powertrain control module (PCM) and/or a transmission control module (TCM), transmission and gearbox functions are overseen by the gearbox devices 216 to implement an automatic transmission, optimize gear changes (e.g., gear shifts), and control torque delivered to the wheels of the vehicle 102. In variations, a vehicle may include one or more subsystems 202-1 for each axle.

A subsystem 202-2 is a human-machine interface (HMI) subsystem. The subsystem 202-2 includes HMI control devices 218 that implement a vehicle user interface. The vehicle user interface enables interaction between occupants (e.g., drivers, passengers) of the vehicle 102 and the vehicle system 200, which enables human intervention of vehicle functions and driving. For example, the HMI control devices 218 control vehicle displays, vehicle dash clusters, heads-up display units, haptic feedback, audible feedback, and other visual driving aids interpreted by the occupants to help with driving or ensuring safe vehicle operations. In one or more implementations, the HMI control devices 218 provide a human interface to effect climate controls (e.g., heating, cooling), cabin features (e.g., infotainment, lighting), and other vehicle body features (e.g., windshield wipers, transmission settings, suspension settings, drive mode selection, power seating, power mirrors, power door locks, etc.).

The subsystem 202-2 also includes one or more remote control devices 220 that allow human or machine inputs to control the vehicle 102 from outside the cabin. For example, in an autonomous or semi-autonomous vehicle context, the remote control devices 220 receive commands over a communication link with a base station (e.g., a mobile phone, a key fob, a remote computing system) to allow a human or machine operator to control the vehicle 102 as if the driving commands are provided directly to the HMI control devices 218. In hot or cold weather, to pre-cool or pre-heat the cabin, the remote control devices 220 may activate remote starting functions. The remote control devices 220 in at least one aspect allow door locks to be locked or unlocked and doors, tailgates or trunks to be remotely opened or closed. The remote control device 220 may also include the remote control application 112 of FIG. 1.

A subsystem 202-3 represents a braking subsystem of the vehicle system 200. For example, one or more brake control devices 222 are operable to manage anti-lock braking systems (ABS), electronic stability controls (ESC), and otherwise convert driver inputs at the HMI control devices 218 to effect performance of vehicle brakes (e.g., for stopping, for decelerating, etc.). In some examples, the brake control devices 222 represent a braking control module (BCM).

Another of the subsystems 202 depicted in FIG. 2 is subsystem 202-4, which is an onboard-vehicle communication subsystem. The subsystem 202-4 manages telematics and communications within the vehicle 102, and with other devices located outside the vehicle 102. For example, the subsystem 202-4 interfaces with the various edge devices coupled to the vehicle network 204 to ensure a healthy exchange of data free of errors or faults. In addition, the subsystem 202-4 interfaces with other vehicles, mobile devices, infrastructure, and remote computing systems to implement various vehicle functions.

One or more telematic devices 224 of the subsystem 202-4 handle offboard communications of the vehicle 102. This includes implementing vehicle-to-vehicle (V2V) and vehicle-to-everything (V2X) communications that enable vehicle 102 to communicate with other intelligent vehicles and systems in an operating environment, e.g., on or near a roadway. The telematic devices 224 interface with over-the-air (OTA) update services to update the software on the vehicle 102, such as the remote control application 112 and/or firmware or software executed by the first safety processor 206 and/or the second safety processor 208, e.g., the remote control API 116 and/or a vehicle operating system. In addition, the telematic devices 224 interface with a positioning system to assist with navigation functions. Other features implemented by the telematic devices 224 include remote diagnostics and interfacing with emergency response services, e.g., to alert emergency responders in the event of an accident automatically. In addition, the remote control application 112 uses the telematic devices 224 to communicate with a corresponding remote control application located on a computing device remote from the vehicle system 200.

One or more network control devices 226 of the subsystem 202-4 monitor the network health of the vehicle network 204 and facilitate communication protocols implemented therein. The network control devices 226 are configured to diagnose problems with the vehicle network 204 to reroute signals and prevent data loss.

Subsystem 202-5 is an advanced driving and safety (ADAS) subsystem of the vehicle system 200. In at least one implementation, subsystem 202-5 has two main functions, including implementing an ADAS and a perception sensor system. For example, one or more ADAS control devices 228 implement ADAS functionality that includes autonomous or semi-autonomous control, adaptive cruise control, emergency braking, lane centering, and other ADAS functions. One or more perception sensor devices 230 support the ADAS control devices 228 by providing information about the driving environment to ensure safe driving. For example, a radar, a camera, a lidar, an ultrasonic sensor, a global position system (GPS) sensor, an inertial measurement unit (IMU), and other sensor technology is deployed by the perception sensor devices 230 to collect sensor data about a vehicle environment. Sensor fusion techniques, object detection, lane centering, path trajectory planning, and other perception sensor functions are executed by the perception sensor devices 230 to enable the ADAS functions performed by the ADAS control devices 228. The remote control application 112 may also provide sensor data from the perception sensor devices 230 to the corresponding remote control application on a remote computing device to assist with remote control of the vehicle 102.

Subsystem 202-6 is a steering subsystem that controls components of the vehicle which steer the wheels. One or more steer control devices 232 integrate with an electric power steering system of the vehicle 102 to control direction of the vehicle wheels. The steer control devices 232 may receive inputs from the remote control application 112 (via the safety processors) and/or the central control unit 104, which are translated into appropriate steering commands for controlling steering actuators that change the direction of the wheels for steering and performing evasive maneuvers.

Subsystem 202-7 represents a body control subsystem of the vehicle 102. Included in the subsystem 202-7 are one or more body control devices 234, which handle functions related to vehicle body controls. For example, window actuators, door locks and latches, interior and exterior lighting, tailgate and trunk latches, and the like are controlled by the body control devices 234 at the command of the central control unit 104 and/or one or more of the other subsystems 202 (e.g., the HMI control devices 218).

Subsystem 202-8 is an active suspension control subsystem. One or more suspension control devices 236 implement functions of a suspension control module (SCM) to regulate suspension components to adjust the ride level of the vehicle 102. For example, suspension control devices 236 configure a vehicle suspension to be stiffer on paved surfaces for improved driving performance and maneuverability. In an offroad setting, though, suspension control devices 236 may enable a softer suspension setting to provide a smoother ride.

Subsystem 202-9 represents a battery management subsystem of the vehicle 102. One or more battery management devices 238 monitor the performance of a battery pack (also referred to as a traction battery) to ensure appropriate charging and discharging rates to promote longevity and overall battery health. The battery management devices 238 control charging operations of onboard vehicle batteries and battery usage, e.g., to control a discharge rate. The battery management devices 238 monitor the health of vehicle batteries to alert the central control unit 104 when a malfunction is imminent or occurs.

Finally, subsystem 202-N is depicted in FIG. 2, which represents a power distribution system. In variations, one or more power distribution devices 240 of the subsystem 202-N manage the distribution of electrical power from energy sources on the vehicle 102 to the vehicle system 200. For example, the power distribution devices 240 control power switches, inverters, converters, and other electrical distribution components to ensure the subsystems 202 receive an appropriate current and voltage level for implementing vehicle functions. The power distribution devices 240 can include fault protection circuits and breakers to interrupt power to a faulty subsystem and maintain safe electrical conditions while the vehicle 102 remains active. The power distribution devices 240 interface with the motor engine devices 214 and the battery management devices 238 to manage safe electrical conditions throughout the vehicle system 200.

The various subsystems 202 may be controlled by the first safety processor 206 and/or second safety processor 208 (examples of the safety processor(s) 108) in connection with various use cases implemented by custom applications executed by the partitioned application processor 110. Similarly, the subsystems 202 may be controlled by the safety processors in accordance with instructions received from a remote operator via the remote control application 112.

Figure 3:
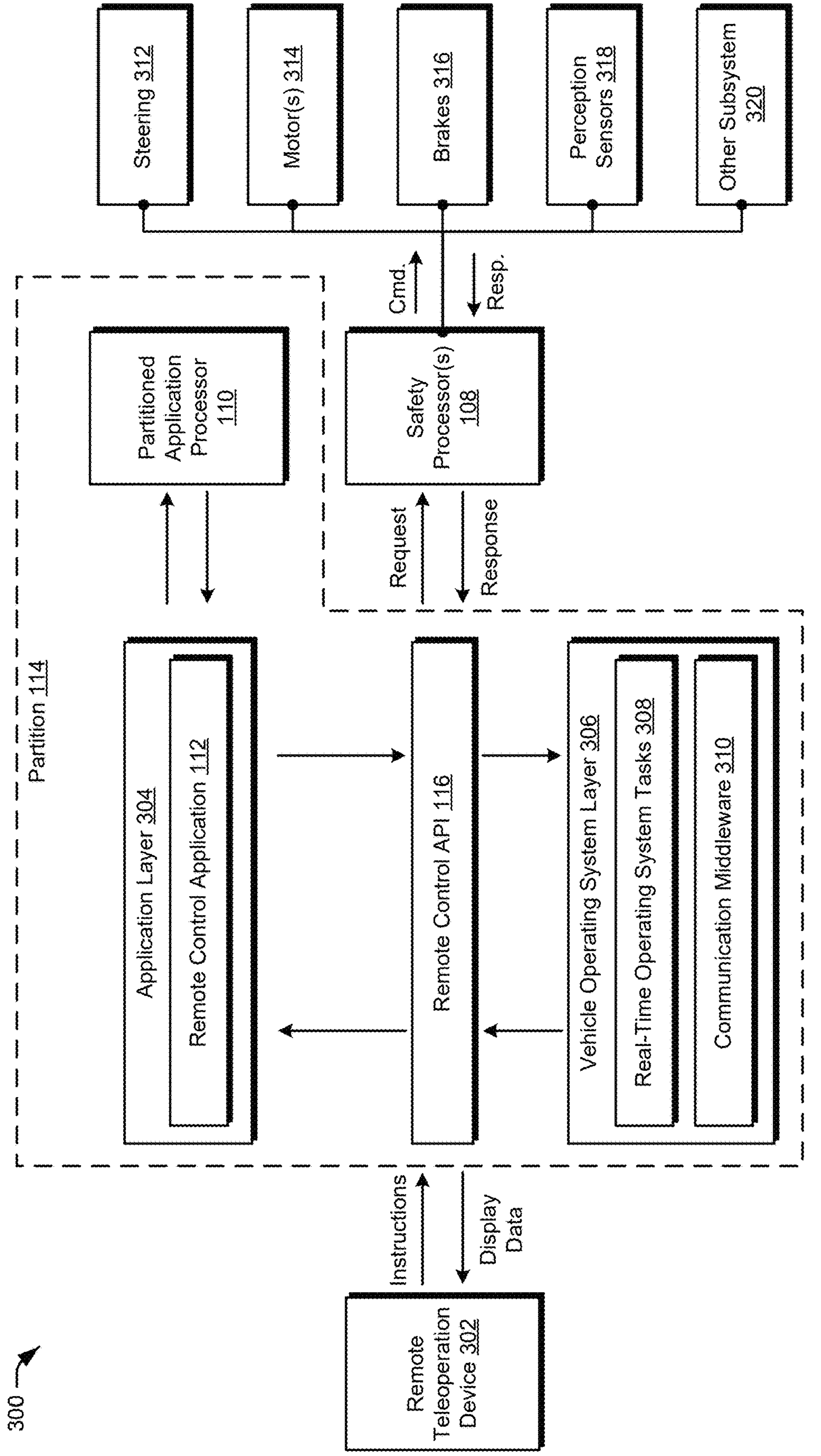
FIG. 3 depicts an example flow diagram in which a remote control application for remote control of autonomous vehicles with operator protection and terrain dynamics utilizes a remote teleoperation device.

FIG. 3 depicts an example flow diagram 300 in which a remote control application for remote control of autonomous vehicles with operator protection and terrain dynamics utilizes a remote teleoperation device.

The illustrated flow diagram 300 includes the safety processor 108, the partitioned application processor 110, remote control application 112, partition 114, and remote control API 116. The illustrated flow diagram 300 also includes a remote teleoperation device 302, application layer 304, vehicle operating system layer 306 that includes real-time operating system tasks 308 and communication middleware 310, and example subsystems of the vehicle 102, including steering 312, motor(s) 314, brakes 316, perception sensors 318, and other subsystem 320. Different configurations of the vehicle 102 may have different subsystems.

Figure 4:
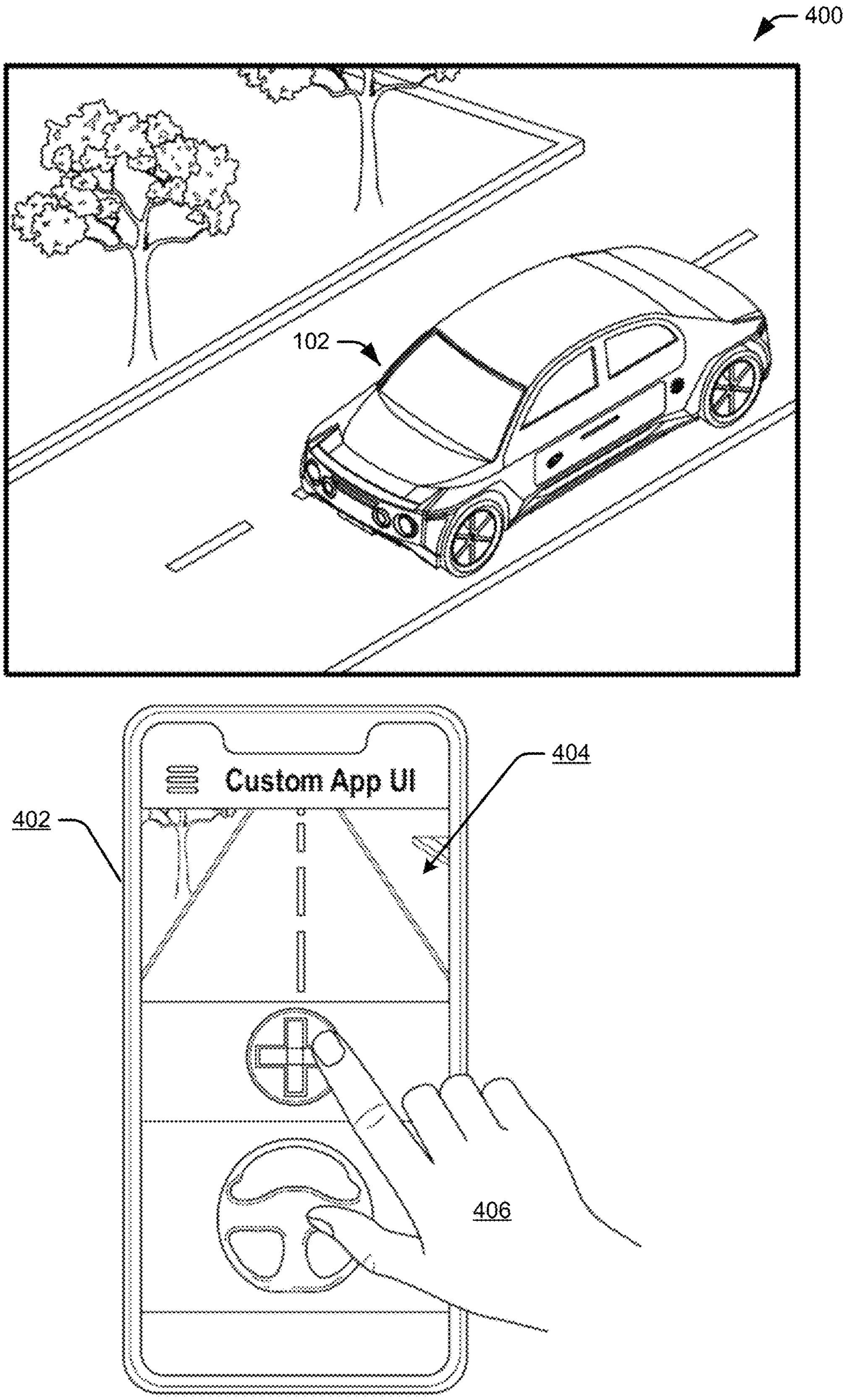
FIGS. 4 and 5 depict example implementations of a remote teleoperation device for remote control autonomous vehicles with operator protection and terrain dynamics.
Figure 5:
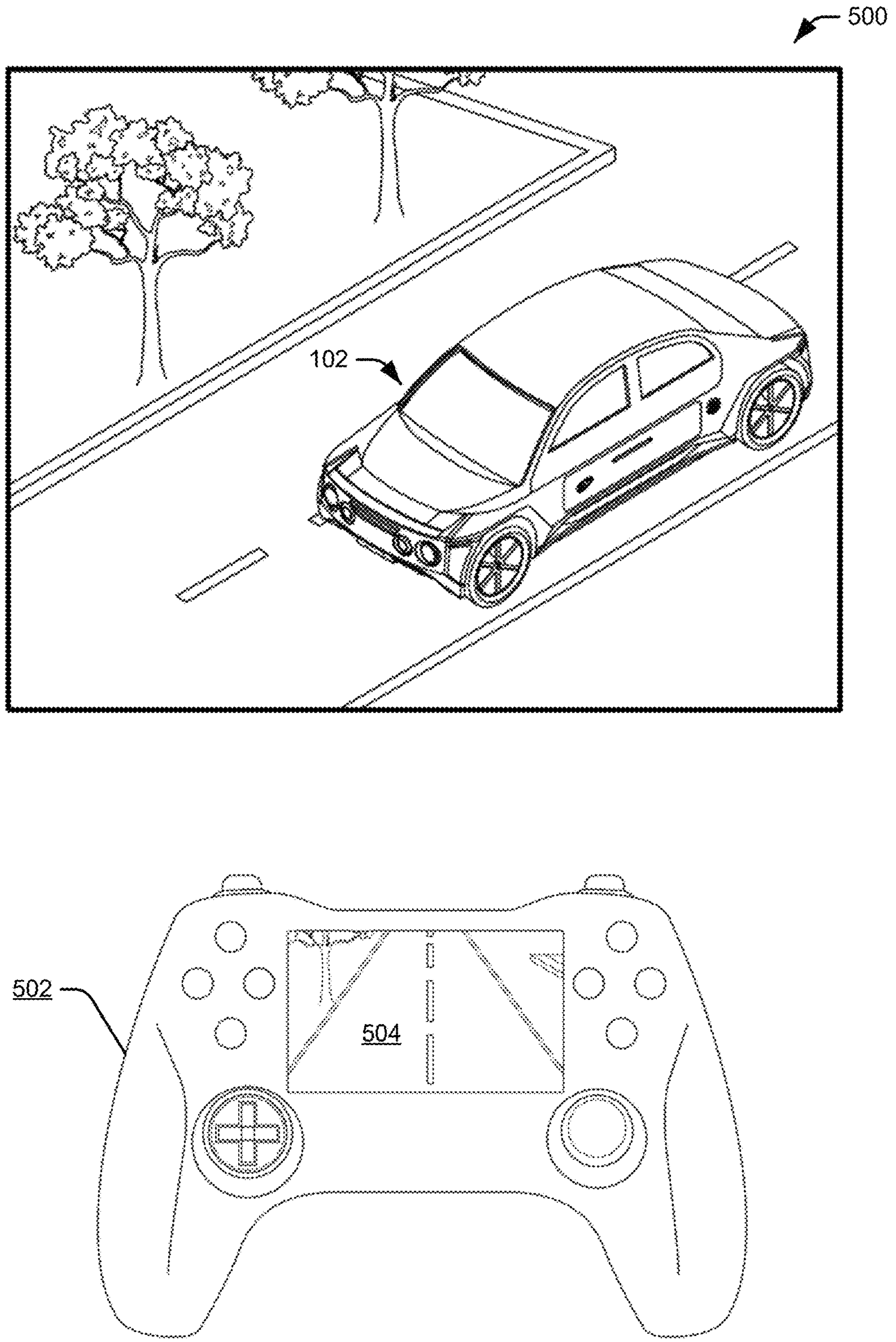

Examples of the remote teleoperation device 302 are provided in FIGS. 4 and 5, such as a smartphone or another input device (e.g., similar to a handheld console or video game controller). In at least one scenario, input is received via the remote teleoperation device 302 (e.g., a touch input in relation to a displayed interactive element or other input mechanism mimicking acceleration, braking, and/or steering commands for the vehicle 102). Responsive to such input, the remote teleoperation device 302 communicates one or more instructions to the partition 114. For instance, the instructions are provided from the remote control application 112, which is communicatively coupled to the remote teleoperation device 302, to the remote control API 116. In some implementations, the remote control application 112 or remote control API 116 converts or translates the instructions into requests recognizable by the safety processor 108 and/or the vehicle subsystems 202.

In accordance with the described techniques, the instructions from the remote teleoperation device 302 are not simply forwarded to the targeted subsystem to cause it to perform the commanded operation. Instead, the instructions are filtered to ensure that performing the operation initiated by the remote teleoperation device 302 is safe or efficacious given the state of vehicle 102. To ensure the operation's safety or effectiveness, the remote control application 112 to which the command corresponds submits a request via the remote control API 116 for arbitration. In one or more implementations, the partitioned application processor 110 is not directly connected to one or more vehicle subsystems (or any subsystems). The partitioned application processor 110 does not have a direct physical connection between an I/O port of the partitioned application processor 110 and those subsystems. Instead, the safety processor 108 is directly connected (e.g., via wired connections or other physical connections) to the vehicle subsystems. Due to this architecture, any remote control application 112 request for a subsystem to perform an operation is channeled through the safety processor 108 first.

Since the remote control application 112 is executed by the partitioned application processor 110 and the remote control API 116 is provided by the safety processor 108, this involves transmitting a request over a communicative coupling (e.g., Ethernet) between the partitioned application processor 110 and the safety processor 108. The remote control API 116 determines whether a requested operation satisfies the safety rules 120 or is compatible with terrain dynamics as described above and below. If the requested operation is determined to satisfy the safety rules 120 or effective for the environment's terrain dynamics, the safety processor 108 submits a command to the respective subsystem to perform the operation, e.g., to the steering 312, motors 314, brakes 316, perception sensors 318, and/or the other subsystem 320. If the requested operation is determined not to satisfy the safety rules 120, the request is denied, and the safety processor 108 discards the request, brings the vehicle 102 to a stop, and/or determines an alternative operation that accounts for the safety or terrain issue but achieves the objective of the remote operator's instructions.

In one or more implementations, the vehicle operating system layer 306 is or includes an operating system, configured to manage hardware resources of the vehicle 102, such as memory and cores of the safety processor(s) 108 as well as the subsystems, and is configured to execute real-time operating system tasks 308 within precise timing constraints, e.g., constraints for operating the vehicle 102 safely within an operating envelope. Broadly, real-time operating systems are designed for systems requiring a high degree of predictability and reliability, where the correctness of operation depends not only on the logical correctness of the software but also on the time at which the results are produced. In one or more implementations, the communication middleware 310 is a layer of software that provides a set of services and capabilities for enabling communication and data exchange between different software applications, components, or systems of the vehicle 102.

FIGS. 4 and 5 depict example implementations 400 and 500, respectively, of a remote teleoperation device for remote control autonomous vehicles with operator protection and terrain dynamics.

In particular, the illustrated examples 400 and 500 includes the vehicle 102 on a roadway. In these examples, the vehicle 102 is idle on the roadway (or other driving environment). For example, the vehicle 102 may need to be parked within a crowded storage environment to complete its autonomous delivery. As another example, the roadway may include a construction zone up ahead and the ADAS subsystem is unable to navigate the construction to complete navigation to a specified destination.

The illustrated example 400 also includes an external computing device 402 with a custom app UI 404, which is operable by a remote user 406. In the illustrated example 400, the external computing device 402 is a smartphone. In other implementations, the external computing device 402 may be a tablet, laptop, desktop computer, or other computing device external to the vehicle 102. This example 400 represents a scenario where the remote user 406 may provide input via a user interface of the custom app UI 404 displayed on the external computing device 402. In this scenario, the remote user 406 provide driving instructions for the vehicle 102 to navigate the construction zone until the ADAS subsystem is able to resume autonomous operations. For instance, the remote user 406 may provide input via the user interface to drive forward at a slow speed and steer around an obstruction or roadway inconsistency (e.g., which the ADAS subsystem was unable to categorize). In accordance with the described techniques, the external computing device 402 may communicate an indication of this input to the partitioned application processor 110 and/or the remote control application 112 over a network (not shown). Responsive to the receipt of the indication, the remote control application 112 causes a request to be sent from the partitioned application processor 110 to the safety processor 108.

Similarly, the illustrated example 500 includes an external computing device 502 with a remote control app UI 504, which a remote user operates. In the illustrated example 500, the external computing device 502 resembles a handheld videogame controller with an interactive screen and different input controls. The various input controls (e.g., buttons and toggles) can be associated with specific instructions for remote control of vehicle 102. In other implementations, the external computing device 502 may be other devices that allow remote control of the vehicle 102 and may or may not include the remote control app UI 504.

As illustrated for both external computing devices 402 and 502, sensor data from one or more perception sensor devices of the vehicle 102 can be provided to the remote operator. In the illustrated examples, a video feed from a front-facing camera system is displayed for the remote operator. Different or additional sensor data (e.g., radar data, ambient temperature, etc.) can be provided in other implementations. In this way, the remote operator is given immediate feedback of the vehicle state as their instructions are carried out by the vehicle.

In accordance with the described techniques, the remote control API 116 then arbitrates the received request. Here, the remote control API 116 determines whether driving forward as the remote user 406 instructed satisfies the safety rules 120. If the driving instructions satisfy the safety rules 120, the operation is permitted and the safety processor 108 issues a command to the motor subsystem, braking subsystem, and steering subsystem to perform the driving operation. However, if the driving instructions do not satisfy the safety rules 120, the operation is denied, and the safety processor 108 discards the request and brings the vehicle 102 to rest (if it had begun driving). Further, the safety processor 108 does not issue a command to the related vehicle subsystems to perform the driving maneuver when a request is denied. In other implementations, the operation is modified (e.g., the vectoring is changed to avoid an obstacle or torque alteration to account for the terrain surface) if the driving instructions do not satisfy the safety rules 120.

In one implementation, the remote operator continues remote control of the vehicle 102 until the ADAS subsystem can resume autonomous operations. Upon being able to resume autonomous operations, the ADAS subsystem or another subsystem relays a message to the remote operator via the remote control application 112 and ceases remote operations.

Figure 6:
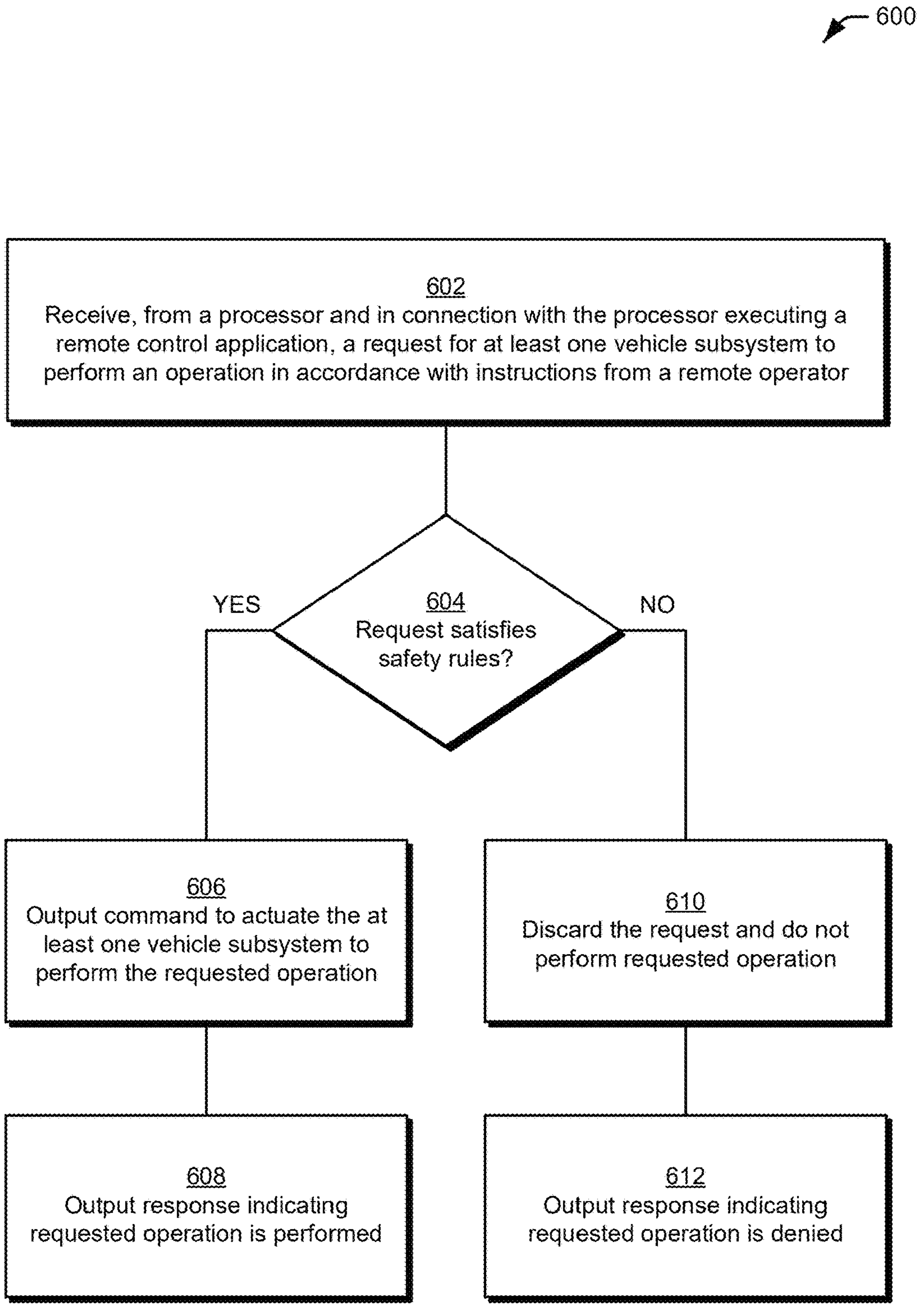
FIG. 6 depicts an example flow diagram for remote control of autonomous vehicles with operator protection and terrain dynamics.

FIG. 6 depicts an example flow diagram 600 for remote control of autonomous vehicles with operator protection and terrain dynamics. The flow diagram 600 includes multiple operations illustrated as block 602 through block 612 and provides just one example flow diagram performed by or within any of the previously described systems (e.g., the central control unit 104). The flow diagram 600 is not limited to the order of operations shown in FIG. 6, other orderings of blocks 602 through 612 are possible. In one or more implementations, the flow diagram 600 includes additional or fewer operations than those depicted in FIG. 6.

A request for at least one vehicle subsystem to perform an operation per a remote operator's instructions is received from a processor in connection with the processor executing a remote control application (block 602). For example, the safety processor 108 receives request 122 from the partitioned application processor 110 over a connection between the safety processor 108 and the partitioned application processor 110. The partitioned application processor 110 executes a remote control application 112. Further, the request 122 includes an operation to be performed by at least one vehicle subsystem (not shown) capable of being actuated by a vehicle subsystem actuator 106 in accordance with instructions for teleoperation of the vehicle 102 received via the remote control application 112.

A determination is made regarding whether the request satisfies safety rules (block 604). By way of example, the remote control API 116 provided by the safety processor 108 determines whether the request 122 satisfies the safety rules 120, which if satisfied maintain the integrity of a safety standard for the vehicle 102 (e.g., ASIL-D integrity). In another implementation, the remote control API 116 determines whether the request 122 is proper, safe, or effective for terrain dynamics of the environment.

If it is determined that the request satisfies the safety rules (e.g., "YES" at block 604), then a command is output to actuate the at least one vehicle subsystem to perform the requested operation (block 606). In one or more implementations, a response is output indicating the requested operation is performed (block 608). By way of example, if the remote control API 116 determines at block 604 that the request 122 satisfies the safety rules 120 or terrain dynamics, then the safety processor 108 outputs a command 118, which is sent to the targeted vehicle subsystem actuator 106 to actuate the respective vehicle subsystem to perform the requested operation. Additionally, the safety processor 108 outputs the response 124 to the partitioned application processor 110 executing the remote control application 112, and the response 124 indicates that the requested operation is performed.

If it is determined that the request does not satisfy the safety rules (e.g., "NO" at block 604), then the requested operation is not performed (block 610). Alternatively or additionally, the request is discarded. In one or more implementations, a response is output indicating the requested operation is denied (block 612). For example, if the remote control API 116 determines at block 604 that request 122 does not satisfy safety rules 120 or terrain dynamics, then the safety processor 108 does not cause the operation to be performed. For instance, the safety processor 108 does not send a command to a vehicle subsystem actuator 106 regarding the requested operation. In one or more implementations, the safety processor 108 also discards the request 122. In at least one implementation, the safety processor 108 outputs the response 124 to the partitioned application processor 110 executing the remote control application 112, and the response 124 indicates that the requested operation is denied. In another implementation, the safety processor 108 determines alternative instructions that satisfy the safety rules 120 or terrain dynamics to achieve an operation similar to that associated with the instructions received from the remote operator.

Figure 7:
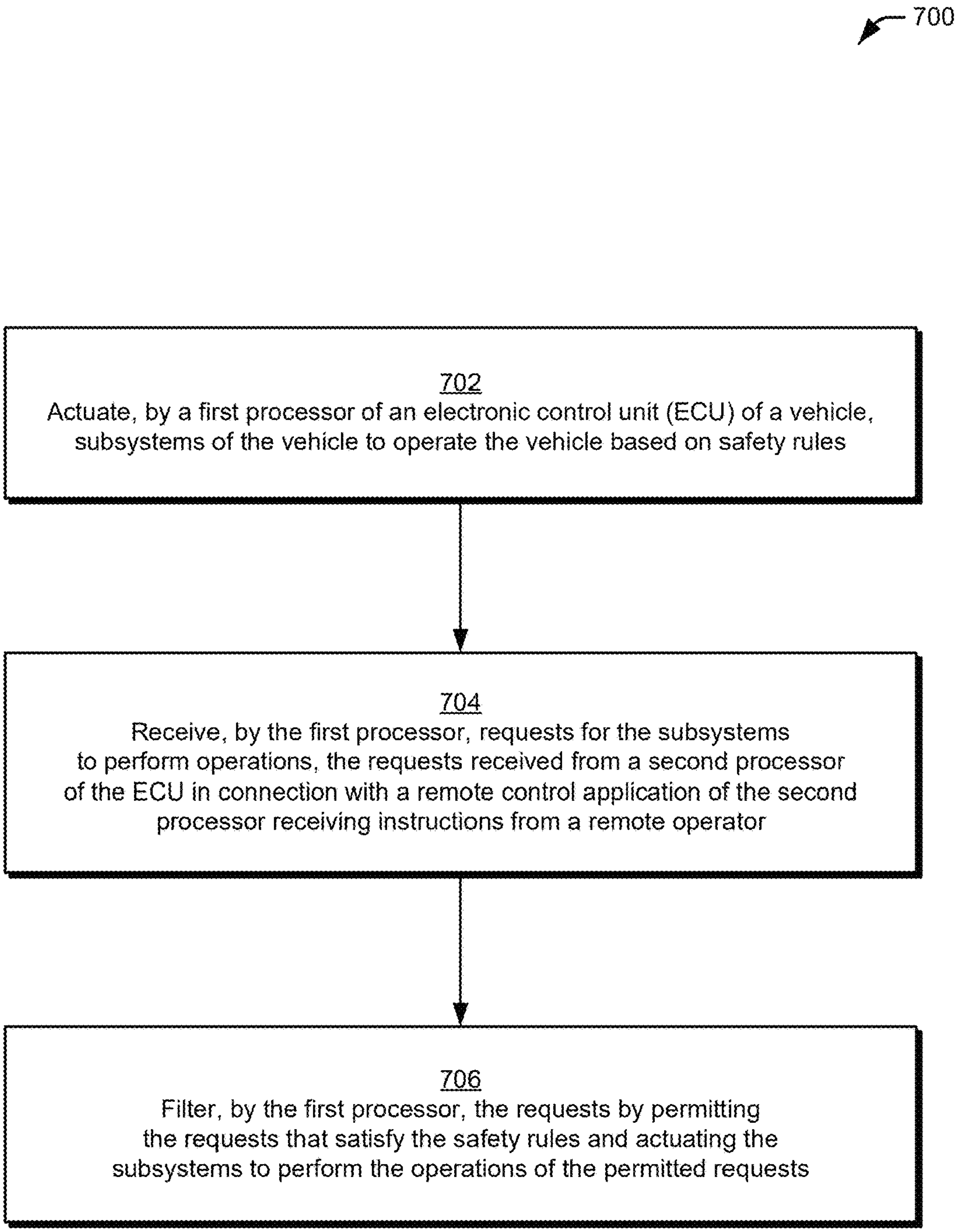
FIG. 7 depicts an example procedure for remote control of autonomous vehicles with operator protection and terrain dynamics.

FIG. 7 depicts an example procedure 700 for remote control of autonomous vehicles with operator protection and terrain dynamics. The procedure 700 includes multiple operations illustrated as block 702 through block 706 and provides just one example procedure performed by or within any of the previously described systems (e.g., the central control unit 104). The procedure 700 is not limited to the order of operations shown in FIG. 7, other orderings of blocks 702 through 706 are possible. In one or more implementations, the procedure 700 includes additional or fewer operations than those depicted in FIG. 7.

Subsystems of a vehicle are actuated, by a first processor of an ECU, to operate the vehicle based on safety rules (block 702). For example, the safety processor 108 actuates the subsystems 202 of the vehicle 102 via the plurality of vehicle subsystem actuators 106 to operate the vehicle 102 based on safety rules (e.g., ASIL-D). The safety processor 108 may actuates the subsystems 202 to control motion of the vehicle 102.

Requests are received, by the first processor, for the subsystems to perform operations (block 704). In accordance with the principles discussed herein, the requests are received from a second processor of the ECU in connection with a remote control application of the second processor receiving instructions from a remote operator. For example, the safety processor 108 receives request 122 in connection with the partitioned application processor 110 executing the remote control application 112. The request 122 corresponds to instructions from a remote operator via the remote control application 112.

The requests are filtered, by the first processor, by permitting the requests that satisfy the safety rules or terrain dynamics and actuating the subsystems to perform the operations of the permitted requests (block 706). For example, the processor 108 filters the request 122 by permitting the request 122 if it satisfies the safety rules 120 (e.g., corresponding to a safety standard) or terrain dynamics (e.g., road surface conditions determined based on tire slippage) and actuating the respective subsystem to perform the requested operation.

It should be understood that many variations are possible based on the disclosure herein. Although features and elements are described above in particular combinations, each feature or element is usable alone without the other features and elements or in various combinations with or without other features and elements.

The various functional units illustrated in the figures and/or described herein are implemented in various manners such as hardware circuitry, software or firmware executing on a programmable processor, or any combination of two or more of hardware, software, and firmware. The methods provided are implemented in various devices, such as a general-purpose computer, a processor, or a processor core. Suitable processors include, by way of example, a general purpose processor, special purpose processor, conventional processor, ECU, digital signal processor (DSP), graphics processing unit (GPU), parallel accelerated processor, a plurality of microprocessors, one or more microprocessors in association with a DSP core, controller, microcontroller, Application Specific Integrated Circuits (ASICs), Field Programmable Gate Arrays (FPGAs) circuits, integrated circuits (IC), and/or state machine.

In one or more implementations, the methods and procedures provided herein are implemented in a computer program, software, or firmware incorporated in a non-transitory computer-readable storage medium for execution by a computer or a processor. Examples of non-transitory computer-readable storage mediums include read only memory (ROM), random-access memory (RAM), a register, cache memory, semiconductor memory devices, magnetic media such as internal hard disks and removable disks, and magneto-optical media.

What is claimed is:

1. A system comprising:

one or more subsystems of a vehicle, each of the one or more subsystems configured to perform vehicle operations;

a communications subsystem of the vehicle configured to receive instructions from a remote operator via a remote teleoperation device to actuate the one or more subsystems to perform at least one operation of the vehicle operations; and a central control unit of the vehicle comprising:

an application processor configured to execute a remote control application that receives the instructions from the remote teleoperation device and outputs requests to a safety processor indicating the at least one operation, the application processor not having a direct communication connection to the one or more subsystems; and the safety processor configured to:

arbitrate the requests from the remote control application by determining whether the requests satisfy safety rules for the vehicle, wherein arbitrating the requests is based on terrain dynamics of an environment of the vehicle, the environment including at least one of road surface traction, terrain slope, or center-of-gravity predictions; and in response to the requests satisfying the safety rules, cause the one or more subsystems to perform the at least one operation associated with the instructions.

2. The system of claim 1, wherein:

a memory of the safety processor is isolated from a memory of the application processor; and the memory of the safety processor is not directly accessible by the application processor.

3. The system of claim 1, wherein the application processor is further configured to provide real-time data from one or more perception sensor devices of the vehicle to the remote operator.

4. The system of claim 3, wherein the real-time data includes at least one of one or more images or a video feed of an environment surrounding the vehicle from a camera system, location data for one or more nearby objects in the environment, or state information for the one or more subsystems or components of the vehicle.

5. The system of claim 1, wherein:

the application processor does not include a direct physical connection to the one or more subsystems of the vehicle; and the safety processor is directly connected to the one or more subsystems via physical connections.

6. The system of claim 1, wherein the application processor is further configured to provide feedback to the remote operator that the instructions cannot be carried out in response to the requests not satisfying the safety rules.

7. The system of claim 1, wherein the safety processor is further configured to:

prevent the requests being communicated to the one or more subsystems of the vehicle in response to the requests not satisfying the safety rules; and determine an alternative operation that satisfies the safety rules to achieve an objective of the instructions received from the remote operator.

8. The system of claim 1, wherein the safety processor provides an application programming interface for the remote control application that prevents access by the remote control application to the one or more subsystems unless the instructions satisfy the safety rules, the remote control application being configured to receive the instructions from the remote operator.

9. The system of claim 1, wherein satisfying the safety rules comprises satisfying at least one of current Automotive Safety Integrity Level D (ASIL D) standards, current ASIL C standards, current ASIL B standards, current ASIL A standards, current ISO standard 26262, current local laws, or current local regulations.

10. The system of claim 1, wherein the safety processor is further configured to provide a bypass option to the remote operator via the application processor, the bypass option allowing actuation of the one or more subsystems for a denied request.

11. The system of claim 1, wherein the central control unit further comprises a third processor configured to operate redundantly with the safety processor to maintain vehicle operations within a safe operating envelope.

12. An electronic control unit for controlling an operation of a vehicle, the electronic control unit comprising:

a first processor configured to receive instructions from a remote operator via a remote teleoperation device to actuate one or more subsystems to perform the operation of the vehicle, the first processor not having a direct communication connection to the one or more subsystems; and a second processor communicably coupled to the first processor, the second processor configured to:

receive requests from the first processor associated with carrying out the instructions from the remote operator;

filter the requests to determine safe requests that satisfy safety rules; and in response to the requests satisfying the safety rules, actuate the one or more subsystems to perform the safe requests, wherein the second processor is further configured not to actuate the one or more subsystems for denied requests based on terrain dynamics of an environment of the vehicle, the environment including at least one of road surface traction, terrain slope, or center-of-gravity predictions.

13. The electronic control unit of claim 12, wherein:

the first processor is physically partitioned from the one or more subsystems and the requests from the first processor are routed to the second processor via a communicative coupling; and a memory of the second processor is isolated from a memory of the first processor and is not directly accessible by the first processor.

14. The electronic control unit of claim 12, wherein the electronic control unit further comprises a third processor configured to operate redundantly with the second processor to maintain vehicle operations within a safe operating envelope.

15. The electronic control unit of claim 14, wherein:

the third processor is configured to maintain the vehicle operations within the safe operating envelope when a malfunction occurs with the second processor; and a communication network of the vehicle includes a first network path communicatively coupling the one or more subsystems to the second processor and a second network path communicatively coupling the one or more subsystems to the third processor.

16. The electronic control unit of claim 12, wherein the second processor is configured to provide a bypass option to the remote operator via the first processor, the bypass option allowing actuation of the one or more subsystems for a denied request.

17. The electronic control unit of claim 12, wherein the safety rules include at least one of current Automotive Safety Integrity Level D (ASIL D) standards, current ASIL C standards, current ASIL B standards, current ASIL A standards, current ISO standard 26262, current local laws, or current local regulations.

18. The electronic control unit of claim 12, wherein the instructions from the remote operator are received by a remote control application executed by the first processor, the remote control application in communication with a corresponding application on a remote computing device.

19. The electronic control unit of claim 18, wherein the corresponding application on the remote computing device is configured to provide instructions for remote control to multiple autonomous vehicles.

20. A method implemented by an electronic control unit for controlling an operation of a vehicle, the method comprising:

receiving, by a first processor of the electronic control unit, instructions to actuate one or more subsystems of the vehicle, the instructions received from a remote operator via a remote teleoperation device, the first processor not having a direct communication connection to the one or more subsystems of the vehicle;

receiving, by a second processor of the electronic control unit and from the first processor, requests associated with carrying out the instructions from the remote operator;

filtering, by the second processor, the requests by permitting the instructions that satisfy safety rules; and in response to the requests satisfying the safety rules, actuating the one or more subsystems, by the second processor, to perform the instructions that satisfy the safety rules, wherein the second processor does not actuate the one or more subsystems for denied requests based on terrain dynamics of an environment of the vehicle, the environment including at least one of road surface traction, terrain slope, or center-of-gravity predictions.

* * * * *